US011929552B2

(12) United States Patent
Blanda et al.

(10) Patent No.: US 11,929,552 B2
(45) Date of Patent: Mar. 12, 2024

(54) MULTI-CHANNEL COMMUNICATIONS ANTENNA

(71) Applicant: ASTRONICS AEROSAT CORPORATION, Amherst, NH (US)

(72) Inventors: Frank J. Blanda, Nashua, NH (US); Eric W. Kratzenberg, Peterborough, NH (US); Benjamin Geist McMahon, Nottingham, NH (US)

(73) Assignee: ASTRONICS AEROSAT CORPORATION, Manchester, NH (US)

( * ) Notice: Subject to any disclaimer, the term of this patent is extended or adjusted under 35 U.S.C. 154(b) by 1244 days.

(21) Appl. No.: 16/318,475

(22) PCT Filed: Jul. 18, 2017

(86) PCT No.: PCT/US2017/042494
§ 371 (c)(1),
(2) Date: Jan. 17, 2019

(87) PCT Pub. No.: WO2018/017518
PCT Pub. Date: Jan. 25, 2018

(65) Prior Publication Data

US 2019/0245269 A1 Aug. 8, 2019

Related U.S. Application Data

(60) Provisional application No. 62/364,928, filed on Jul. 21, 2016.

(51) Int. Cl.
*H01Q 13/02* (2006.01)
*H01Q 1/28* (2006.01)
(Continued)

(52) U.S. Cl.
CPC ........... *H01Q 13/025* (2013.01); *H01Q 1/288* (2013.01); *H01Q 5/392* (2015.01); *H01Q 9/28* (2013.01);
(Continued)

(58) Field of Classification Search
CPC ...... H01Q 13/025; H01Q 1/288; H01Q 5/392; H01Q 9/28; H01Q 19/08; H01Q 25/001; H01Q 1/28
See application file for complete search history.

(56) References Cited

U.S. PATENT DOCUMENTS 390,350 A 2/1888 Denton
2,692,336 A 10/1954 Kock
(Continued)

FOREIGN PATENT DOCUMENTS

CH 664848 A5 3/1988
CN 664848 3/1988
(Continued)

OTHER PUBLICATIONS

Storkus, Walter L., “Design Techniques for Compact Monopulse Antenna Feeds for W-Band Radar Systems,” IEEE MTT-S International Microwave Symposium-Digest (1990) pp. 805-808.
(Continued)

*Primary Examiner* — David E Lotter

(57) ABSTRACT

An antenna structure configured for simultaneous communication over multiple channels or with multiple locations. In certain examples the antenna system includes an antenna, such as a horn antenna, a lens, or a horn-lens combination, for example, and a focal plane array located near the focal point of the antenna. The focal plane array can be made up of a plurality of sub-wavelength elements, and is configured to simultaneously excite and/or receive a plurality of beams, each having an independent pointing angle to communicate
(Continued)

with multiple fixed or non-fixed communication terminals in different locations.

16 Claims, 4 Drawing Sheets

(51) Int. Cl.
*H01Q 5/392* (2015.01)
*H01Q 9/28* (2006.01)
*H01Q 19/08* (2006.01)
*H01Q 25/00* (2006.01)

(52) U.S. Cl.
CPC ........... *H01Q 19/08* (2013.01); *H01Q 25/001* (2013.01); *H01Q 1/28* (2013.01)

(56) References Cited

U.S. PATENT DOCUMENTS

| | | | | |
|---|---|---|---|---|
| 2,718,592 | A | 9/1955 | Smith | |
| 2,764,757 | A | 9/1956 | Rust et al. | |
| 2,884,629 | A | 4/1959 | Mason | |
| 2,908,002 | A | 10/1959 | Van | |
| 3,102,263 | A | 8/1963 | Meyer | |
| 3,329,958 | A | 7/1967 | Anderson | |
| 3,566,309 | A | 2/1971 | Ajioka | |
| 3,623,111 | A | 11/1971 | Provencher et al. | |
| 3,877,031 | A | 4/1975 | Mailloux et al. | |
| 4,210,915 | A | 7/1980 | Kienberger et al. | |
| 4,228,410 | A | 10/1980 | Goudey et al. | |
| 4,366,453 | A | 12/1982 | Schwarz | |
| 4,498,061 | A | 2/1985 | Morz et al. | |
| 4,654,622 | A * | 3/1987 | Foss | H01Q 5/42 338/14 |
| 4,659,658 | A | 4/1987 | McCarthy et al. | |
| 4,673,943 | A | 6/1987 | Hannan | |
| 4,783,663 | A | 11/1988 | Rammos et al. | |
| 4,827,269 | A | 5/1989 | Shestag et al. | |
| 4,951,061 | A | 8/1990 | Lee | |
| 4,959,658 | A | 9/1990 | Collins | |
| 5,086,304 | A | 2/1992 | Collins | |
| 5,117,240 | A | 5/1992 | Anderson et al. | |
| 5,154,973 | A | 10/1992 | Imagawa et al. | |
| 5,166,698 | A | 11/1992 | Ashbaugh et al. | |
| 5,305,001 | A | 4/1994 | Wong et al. | |
| 5,359,338 | A | 10/1994 | Hatcher, Jr. et al. | |
| 5,905,457 | A | 5/1999 | Rashid | |
| 5,973,647 | A | 10/1999 | Barrett et al. | |
| 5,977,930 | A | 11/1999 | Fischer et al. | |
| 6,023,246 | A | 2/2000 | Tanabe | |
| 6,036,893 | A | 3/2000 | Lier et al. | |
| 6,201,508 | B1 | 3/2001 | Metzen et al. | |
| 6,208,307 | B1 | 3/2001 | Frisco et al. | |
| 6,307,523 | B1 | 10/2001 | Green et al. | |
| 6,366,244 | B1 | 4/2002 | Fernandes | |
| 6,388,621 | B1 | 5/2002 | Lynch | |
| 6,489,928 | B2 | 12/2002 | Sakurada | |
| 6,509,880 | B2 | 1/2003 | Sabet et al. | |
| 6,563,398 | B1 | 5/2003 | Wu | |
| 6,807,396 | B2 | 10/2004 | Horie et al. | |
| 6,950,073 | B2 | 9/2005 | Clymer et al. | |
| 6,990,639 | B2 | 1/2006 | Wilson | |
| 6,992,639 | B1 | 1/2006 | Lier | |
| 7,034,771 | B2 * | 4/2006 | Rao | H01Q 25/007 343/781 R |
| 7,403,166 | B2 | 7/2008 | Clymer et al. | |
| 7,423,604 | B2 | 9/2008 | Nagai | |
| 7,439,925 | B2 * | 10/2008 | Huang | H01Q 13/0266 343/786 |
| 7,564,421 | B1 | 7/2009 | Edwards et al. | |
| 7,565,421 | B2 | 7/2009 | Naruse | |
| 7,791,549 | B2 | 9/2010 | Clymer et al. | |
| 8,427,384 | B2 | 4/2013 | Clymer et al. | |
| 8,760,354 | B2 | 6/2014 | Clymer et al. | |
| 9,293,835 | B2 | 3/2016 | Clymer et al. | |
| 9,774,097 | B2 | 9/2017 | Clymer et al. | |
| 10,131,445 | B2 | 11/2018 | Ferguson et al. | |
| 10,992,052 | B2 | 4/2021 | Kratzenberg et al. | |
| 2002/0067317 | A1 | 6/2002 | Sakurada | |
| 2004/0066345 | A1 | 4/2004 | Schadler | |
| 2006/0071876 | A1 | 4/2006 | Clymer et al. | |
| 2007/0001918 | A1 | 1/2007 | Ebling et al. | |
| 2007/0273599 | A1 | 11/2007 | Haziza | |
| 2010/0188304 | A1 | 7/2010 | Clymer et al. | |
| 2015/0123863 | A1 * | 5/2015 | Legay | H01P 5/12 343/905 |
| 2015/0266244 | A1 | 9/2015 | Page | |
| 2016/0006129 | A1 | 1/2016 | Haziza | |
| 2018/0164430 | A1 | 6/2018 | Kuriyama et al. | |
| 2019/0310345 | A1 | 10/2019 | Nagaishi et al. | |

FOREIGN PATENT DOCUMENTS

| | | | |
|---|---|---|---|
| CN | 1031451 | A | 3/1989 |
| CN | 1680402 | A | 10/2005 |
| EP | 0390350 | A2 | 10/1990 |
| EP | 0390350 | B1 | 2/1995 |
| GB | 2108770 | A | 5/1983 |
| GB | 2208969 | A | 4/1989 |
| GB | 2232010 | A | 11/1990 |
| JP | 55-093106 | | 6/1980 |
| JP | 59-022403 | U | 2/1984 |
| JP | 62-58706 | | 3/1987 |
| JP | 04-150501 | A | 5/1992 |
| JP | 06061900 | A | 3/1994 |
| JP | 2004-179738 | A | 6/2004 |
| JP | 2005-536929 | A | 12/2005 |
| JP | 04150501 | B2 | 9/2008 |
| WO | 97/008775 | A1 | 3/1997 |
| WO | 2004019443 | A1 | 3/2004 |

OTHER PUBLICATIONS

International Search Report and Written Opinion in International Patent Application No. PCT/US2017/042494 dated May 1, 2018.

* cited by examiner

MULTI-CHANNEL COMMUNICATIONS ANTENNA

CROSS-REFERENCE TO RELATED APPLICATIONS

This application is a U.S. National Phase Application under 35 U.S.C. § 371 of International Application No. PCT/US2017/042494 filed Jul. 18, 2017, which claims the benefit under 35 U.S.C. § 119(e) and PCT Article 8 of U.S. Provisional Application No. 62/364,928 titled "MULTI-CHANNEL COMMUNICATIONS ANTENNA" and filed on Jul. 21, 2016, which is herein incorporated by reference in its entirety for all purposes.

BACKGROUND

There are numerous applications in which it is desirable to be able to communicate simultaneously with multiple points or over multiple channels. For example, in a multi-satellite TV or data client station, there is a need to communicate (either receive only or transmit/receive) with multiple satellites simultaneously. Some reasons for this need include the existence of multiple TV receivers on channels that span multiple satellites, overflow/bandwidth multiplexing, and redundancy.

A conventional example of a multi-channel antennas is a multi-LNB dish, such as the DirecTV™ SL3 triple LNB, for example. A multi-LNB dish antenna including a dish and feed array designed to receive two or three spaced apart satellites has two or three feeds, each with an LNB. The dish acts as a mirror and forms an inverted and reversed image of the many satellites in a curved line in the focal region. The feeds need to be spaced apart to suit the satellite azimuth and elevation pointing angle differences. The multiple LNBs (low noise block downconverters) are offset from the center focal point of the dish, thus skewing the direction of the main beam in a direction off normal (in degrees), according to Equation (1):

$$\text{Theta\_skew}=\arctan(\text{offset distance from center})/(\text{focal depth}) \quad (1)$$

While a multi-LNB dish antenna can achieve multi-channel simultaneous communications, the dish is typically large and therefore unsuitable for certain applications. For example, in avionics applications it is desirable to minimize the size, weight, and drag effect on the aircraft of the antenna. U.S. Pat. No. 6,950,073 discloses examples of a horn/lens antenna suitable for avionics application having an efficient aperture which a short focal depth, much shorter than that of a dish antenna with equivalent gain.

SUMMARY OF THE INVENTION

As discussed above, there are numerous applications in which it is desirable to be able to communicate simultaneously with multiple points or over multiple channels such as in multi-satellite applications. It may be further desirable that simultaneous multi-satellite communications be accomplished using a single aperture to save space. In addition, certain applications, such as avionics applications, may place additional constraints on attributes of the antenna system, such as its size and weight, for example.

A small aperture antenna, such as an example of the horn/lens antennas disclosed in U.S. Pat. No. 6,950,073, can be fed with an offset feed, such as a waveguide opening, for example, in order to attain any arbitrary Theta_skew in Equation (1). However, as Theta_skew becomes small, the feed apertures must be placed very close together, which can present implementation problems. For example, in DirecTV applications, three satellites are spaced at −2.2 deg, 0 deg, and +2.2 deg. For a small horn/lens aperture that is sufficiently small to fit on an aircraft tail, this requires a Theta_skew so small that the waveguide feed would need to be shrunk such that the frequency of operation would be in cutoff. For a waveguide feed minimally small (cutoff frequency just below frequency of operation), the minimum skew angle is larger than the requirement that must be met for DirecTV applications. There are methods to reduce the size of the waveguide feed, such as loading it with high dielectric material, but this presents an impedance matching problem, as well as disrupting the phase front and aperture phase error associated with the fields penetrating the matching section.

Aspects and embodiments provide a solution; in particular, an antenna structure capable of communication over multiple channels or with multiple locations (e.g., using multiple beams) simultaneously while having a low profile and relatively low weight such that the antenna is suitable for use in avionics and other applications. As discussed further below, according to certain embodiments an antenna system is configured to provide a plurality of simultaneous beams to communicate with multiple fixed or non-fixed points, such as satellites, aircraft, and/or base stations, for example. Each of beams can point in a different direction, such that the antenna system can communicate simultaneously with multiple points that are in different locations.

According to certain embodiments, the antenna system includes an antenna, such as a horn antenna, a lens, or a horn-lens combination, for example, and a focal plane array located near the focal point of the antenna. In certain examples the focal plane array can be located in the throat of the horn antenna. The focal plane array can be made up of a plurality of sub-wavelength elements, that when fed with the correct amplitude and phase cause a beam to steer in the same manner as would occur with an offset feed. Thus, the focal plane array can simultaneously excite and/or receive a plurality of beams, each pointing in a different direction.

According to one embodiment, an antenna system includes a horn antenna, and a feed structure disposed within the horn antenna, the antenna system configured to produce a plurality of simultaneous beams each having an independent pointing angle to communicate with multiple fixed or non-fixed communication terminals in different locations.

In one example the antenna system further includes a lens mounted to the horn antenna, wherein the feed structure is positioned proximate a focal point of the lens.

The communication terminals may include at least one of satellites, aircraft, and base stations, for example.

In one example the feed structure includes a focal plane array. In one example the focal plane array includes a plurality of bowtie elements. In another example the multiple communication terminals include three communication terminals, and the focal plane array includes five bowtie elements. In one example the five bowtie elements include one central bowtie element and four edge bowtie elements arranged in a crossed configuration around the central bowtie element. In another example the central bowtie element is a dual-band bowtie element configured for operation in the Ku and Ka frequency bands, and the four edge bowtie elements are single-band bowtie elements configured for operation in the Ka frequency band. In another example the central bowtie element is larger than each of the four edge bowtie elements. In one example the focal plane array is axially symmetric. In another example the focal plane array is axially asymmetric.

According to another embodiment an antenna system includes a horn antenna, a dielectric lens mounted to the horn antenna and disposed at least partially within an aperture of the horn antenna, and a focal plane array disposed within the horn antenna and located proximate a focal point of the lens, the focal plane array including a plurality of radiating elements such that the antenna system is configured to produce a plurality of independent beams with different pointing angles covering at least two distinct frequency bands.

In one example the plurality of independent beams includes three independent beams and the at least two distinct frequency bands include the Ka band and the Ku band. In another example the plurality of radiating elements of the focal plane array includes a plurality of bowtie elements. In one example the plurality of bowtie elements includes five bowtie elements arranged in a crossed configuration. In another example the five bowtie elements include a central dual-band bowtie element configured for operation in the Ka and Ku bands, and four edge single-band bowtie elements arranged around the central dual-band bowtie element and each configured for operation in the Ku band, the central dual-band bowtie element being larger than each of the four edge single-band bowtie elements.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 4 is an HFSS model plot of the circular polarization gain as a function of theta angle for an example of the antenna system of FIGS. 1-3;

FIG. 5 is an HFSS model plot of phi and theta gain for the example of the antenna system of FIGS. 1-3;

FIG. 6 is an HFSS model plot of the Ku band gain at broadside for the example of the antenna system of FIGS. 1-3, with only the center bowtie element excited for broadside operation; and FIG. 7 is an HFSS model plot of the return loss as a function of frequency for the example of the antenna system of FIGS. 1-3 with a 90 Ohm source.

DETAILED DESCRIPTION

Aspects and embodiments are directed to an antenna structure capable of communication over multiple channels or with multiple locations (e.g., using multiple beams) simultaneously while having a low profile and relatively low weight such that the antenna is suitable for use in avionics and other applications. The antenna system can be configured to provide a plurality of simultaneous beams that can be pointed in different directions to allow for communication with multiple fixed or non-fixed points that are in different locations.

Figure 1:
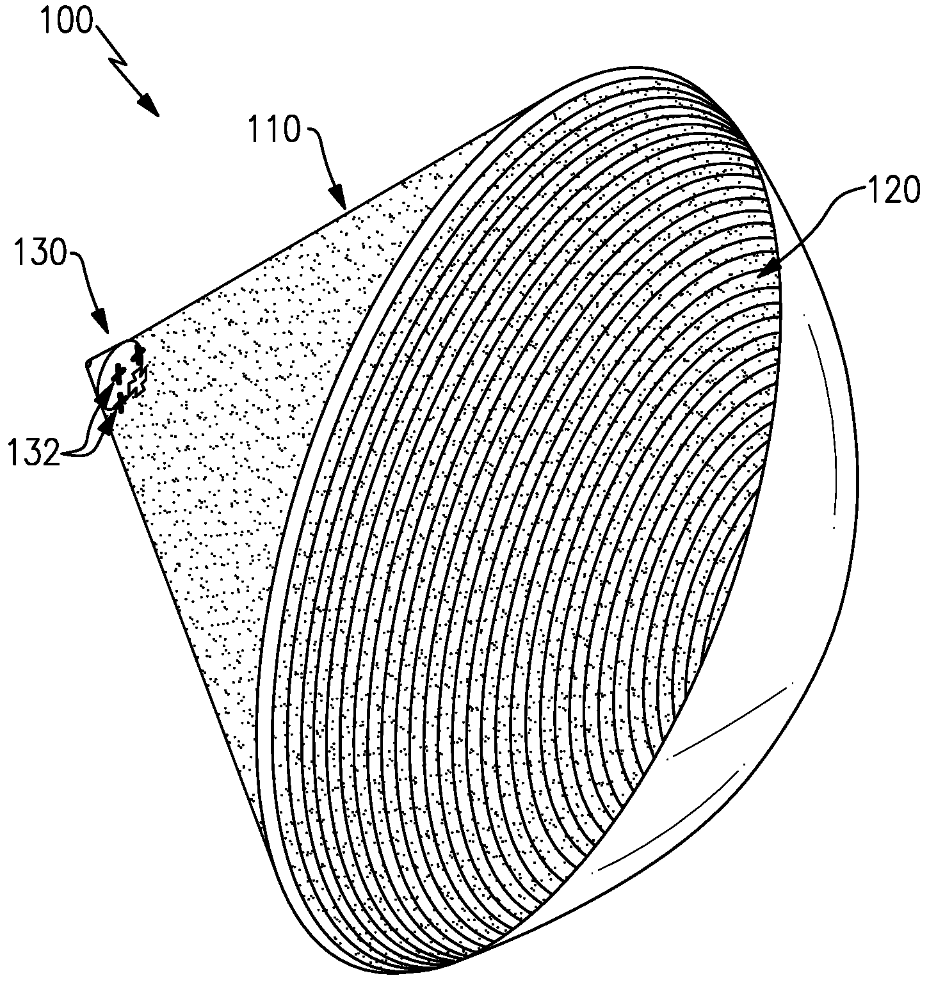
FIG. 1 is a diagram of one example of an antenna system according to aspects of the present invention.

An example of a multi-beam antenna system 100 in accord with certain embodiments is shown in FIG. 1. In this example the antenna system 100 includes a horn antenna 110 with a plano-convex lens 120 and a focal plane array 130 positioned near the focal point of the horn/lens combination. In this example the focal plane 130 array includes a plurality of planar bowtie elements 132 positioned over a ground plane; however, a variety of other configurations of the focal plane array 130 can be implemented. For example, dipole, crossed-dipole, or vivaldi elements can be used instead of bowtie elements. In certain examples, the focal plane array 130 may include an N element (N being an integer greater than or equal to one) linearly polarized stacked dipole array, an N element dual-band dipole array, or an N element stacked coupled dipole array. In another example the focal plane array 130 may include an N element planar toothed linearly polarized array. In other examples the focal plane array 130 can include an N element current sheet array (CSA) or degenerate band edge (DBE) array. In other examples, particularly where the size of the focal plane may be less constrained, the focal plane array 130 can include a circular waveguide-fed array. In certain examples the beam (s) of the antenna system 100 can be steered by a few degrees by phasing the planar bowtie elements 132 in the focal plane array 130.

Although certain embodiments of the antenna system advantageously use a focal plane array placed near the focal point of a horn, lens, or horn/lens combination antenna, in other embodiments the focal plane array can be replaced with another structure. For example, the horn antenna or horn/lens combination can be fed using a plurality of independent air-filled waveguides located side-by-side, instead of using the focal plane array. As noted above, in certain applications (such as multi-channel TV applications, for example) it may be difficult to achieve a desired beam offset in theta for certain frequency bands (e.g., Ka or Ku); however, this arrangement may be used in other applications where the beam offset requirements are less stringent.

In other examples the horn antenna or horn/lens combination can be fed using a plurality of independent dielectric-filled waveguides with various matching techniques. One example of a matching technique includes using a pyramidal taper. For example, an impedance taper from an alumina-filled waveguide to free space can be used. This method may not sufficiently cover the bandwidth of both Ka and Ku bands for certain TV applications, and the return loss is not necessarily equal for two lowest order modes; however, this approach may be used for other applications. Another example of a matching technique includes using a quarter-wave dielectric (e.g., alumina) protrusion with an air gap. The air gap provides series reactance to assist in matching the quarter-wave protruded dielectric piece. This approach may also have some bandwidth limitations, and the return loss is not necessarily equal for two lowest order modes; however, this structure may be used for certain applications. Another example of a matching technique includes the use of single and double layer spherical matching layers over the feed region, with layered tapering to free space impedance. Structures using this approach may have improved bandwidth; however, the layers can cause aberrations in the near field such that the antenna may have limited gain at certain frequencies (e.g., in the Ka band). In certain examples choke rings can be added choke rings around the feed waveguides, and optionally up the walls of the horn antenna. Modifications may also be made to the horn antenna structure and/or the lens structure; however, antenna systems using these dielectric-filled feed waveguides may still have limited gain in at least some frequency bands.

According to other embodiments, the focal plane array can be replaced with a multiband rod antenna, optionally including a center conductor. This structure can be useful for various applications; however for multiband TV applications using the Ka and Ku bands, the tight element spacing needed for high aperture efficiency may cause pattern distortion at Ka frequencies.

Thus, aspects and embodiments provide an antenna system capable of producing a plurality of simultaneous beams, each pointing a different direction, to communicate with multiple fixed or non-fixed satellites and/or aircraft and/or base stations, for example, in different locations. The plurality of beams are excited and/or received by a feed structure positioned proximate or within a main antenna, such as a horn antenna, lens, or horn/lens combination. For example, the feed structure can be placed in the throat of the horn antenna, or at or near a focal point of the horn, lens, or horn/lens combination. As discussed above, in certain preferred embodiments the feed structure includes a focal plane array, which may include a plurality of bowtie elements, but can include any radiating element that be beamform in a steering array. Further, as discussed above, in other embodiments the feed structure can include any of a variety of antenna structures, not limited to a focal plane array. In certain examples the focal plane array can be axially symmetric, meaning that it is symmetric about the center element. In other example, e.g., if scanning in only a single phi or theta component is necessary (such as in the geostationary satellite belt), the focal plane array can be assymetric. An assymetric array may include a line of elements, with the horn throat squeezed asymmetrically to direct more energy at the line array.

The function and advantages of these and other embodiments will be more fully understood from the following example. The example is intended to be illustrative in nature and not to be considered as limiting the scope of the devices, systems and methods discussed herein.

Example Design

In the example design below, a lens/horn antenna fed with a focal plane array to form three independent beams, each of which can be steered to a selected pointing angle, in two frequency bands, as described in the requirements below, was modeled. The intended use was to receive simultaneously the DirecTV Ka/Ku/Ka constellation 101/110/119. The modeled antenna corresponds to the example shown in FIG. 1.

Figure 2:
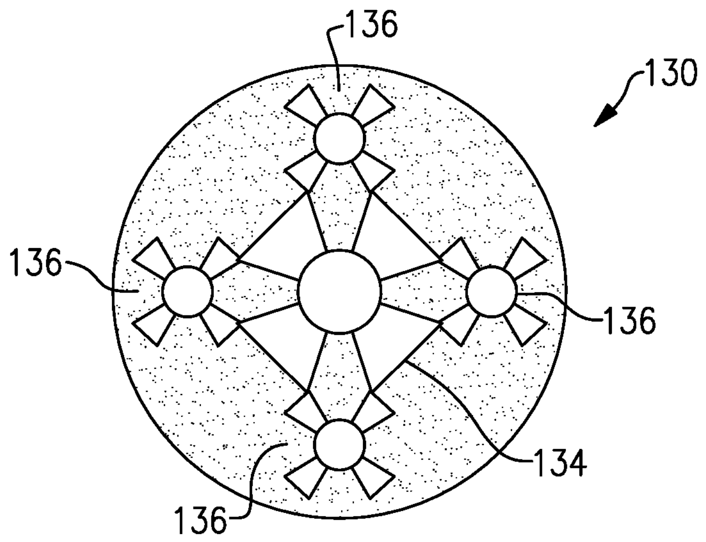
FIG. 2 is a diagram showing one example of a focal plane array that can be used in the antenna system of FIG. 1 according to aspects of the present invention.

For this example, the following requirements were specified:

1) Frequency Bands: 12.2-12.75 GHz, 18.3-20.2 GHz, all frequencies instantaneously
2) Three independent beams at different angles: Ka @-2.2 deg, Ku @ 0 deg, Ka @ 2.2 deg
3) Ka gain ~33 dBiC, Ku gain ~29 dBi
4) Switchable right hand and left hand circular polarization
5) Fit within horn/lens combination antenna swept volume In this example, the focal plane array 130 was a 5-element multiband bowtie focal plane array, as shown in FIG. 2. In particular, the bowties are arranged at the focal plane in a cross arrangement, with the focal plane array 130 including one larger central bowtie element 134 and four surrounding smaller bowtie elements 136 in the arrangement shown in FIG. 2. The central bowtie 134 is a dual band (Ku/Ka) and the smaller edge bowties 136 are single band (Ka) because the Ku beam does not require a skew in this constellation. The focal plane array 130 was modeled as copper elements printed on a multilayer circuit board, such as those available from Rogers Corporation or Taconic.

Figure 3:
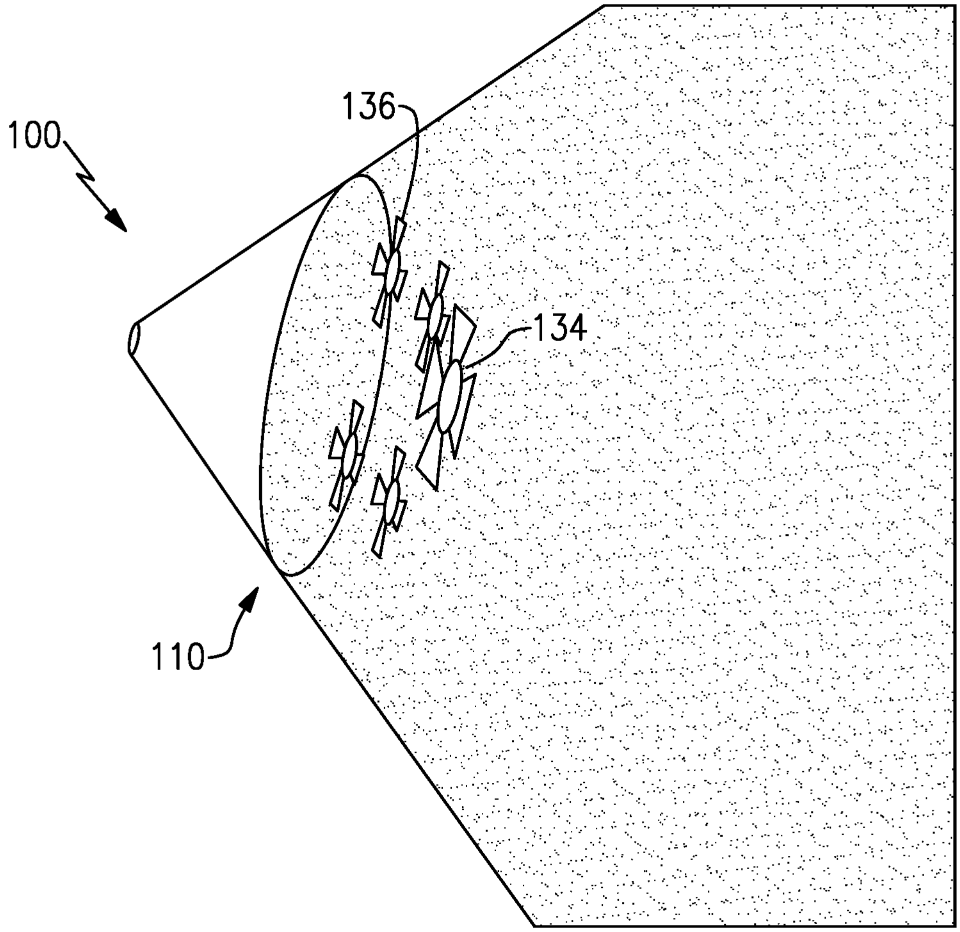
FIG. 3 is a partial side perspective view of the antenna system of FIG. 1.

FIG. 3 is a partial side perspective view of the antenna system 100, showing the position of the focal plane array 130 relative to the horn antenna 110, and the scale. As shown, in this example certain ones of the bowtie elements are offset "vertically" (i.e., with respect to their depth inside the horn antenna) from the others. The offset may be achieved using dielectric spacers or other techniques know to those skilled in the art.

Simulations of the antenna system shown in FIGS. 1-3 demonstrated that by inserting the focal plane array 130 near the focus of the horn/lens combination antenna, it is possible to meet all the requirements identified above to close a link on all three satellites. Specifically, simulations showed that the following performance characteristics were achieved:

Ka switchable sense circular polarization (CP) CP Gain at +/−2.2°: 33.2 dBiC
Ku linear or CP gain at 0°: 29.1 dBi
Frequency band: 10.7-12.75, 18-21 GHz
Return loss: better than −10 dB across entire frequency band
Pattern shows 23 dB rejection from Ka satellite opposite (+2.2 vs. −2.2).

The antenna system of this example is used with the following additional hardware: a Ku/Ka diplexer for the center bowtie element, a 3 or 5-way Ka combiner, with optional amplitude control; downconverters; and 3× or 5× Ku/Ka low noise amplifiers, or 3× or 5× Ka and 1× Ku low noise amplifiers.

FIGS. 4-7 show HFSS model plots for this example antenna system, supporting the achieved performance characteristics noted above. HFSS is a commercial finite element method solver for electromagnetic structures, available from Ansys, Inc.

Figure 4:
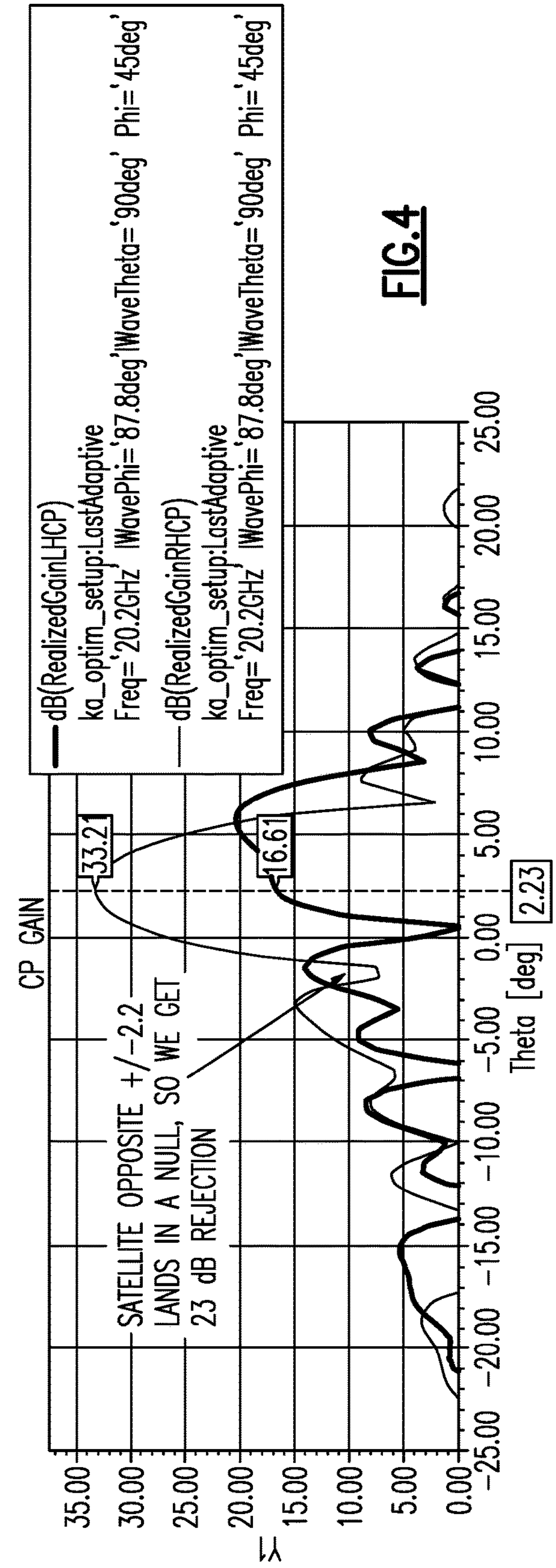
FIGS. 4-7 show HFSS model plots for this example antenna system, supporting the achieved performance characteristics noted above.

FIG. 4 is a plot of the circular polarization gain as a function of theta angle. The Ka gain is scanned to 2.2 degrees (33.2 dBiC realized gain). The opposite satellite is in the first null of the pattern, increasing interference rejection.

Figure 5:
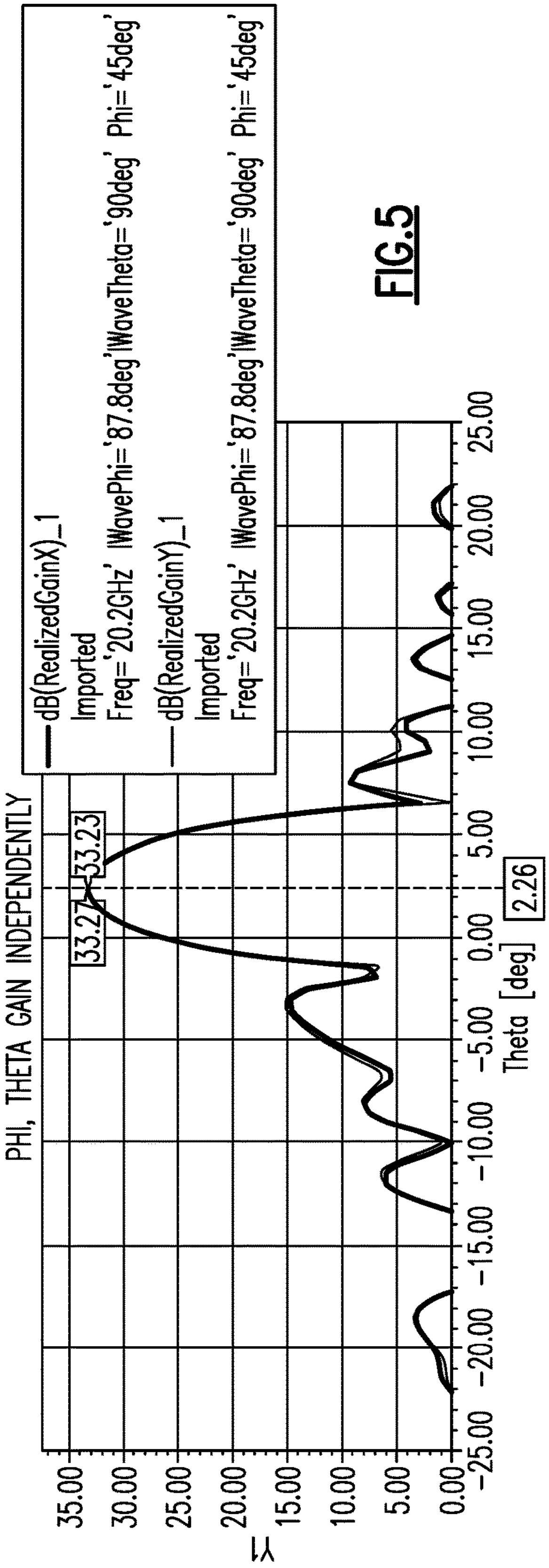

FIG. 5 is a plot of phi and theta gain. FIG. 5 demonstrates symmetry in phi/theta polarizations at an off broadside scan angle. This is an important factor in keeping axial ratio low as the beam scans off broadside.

Figure 6:
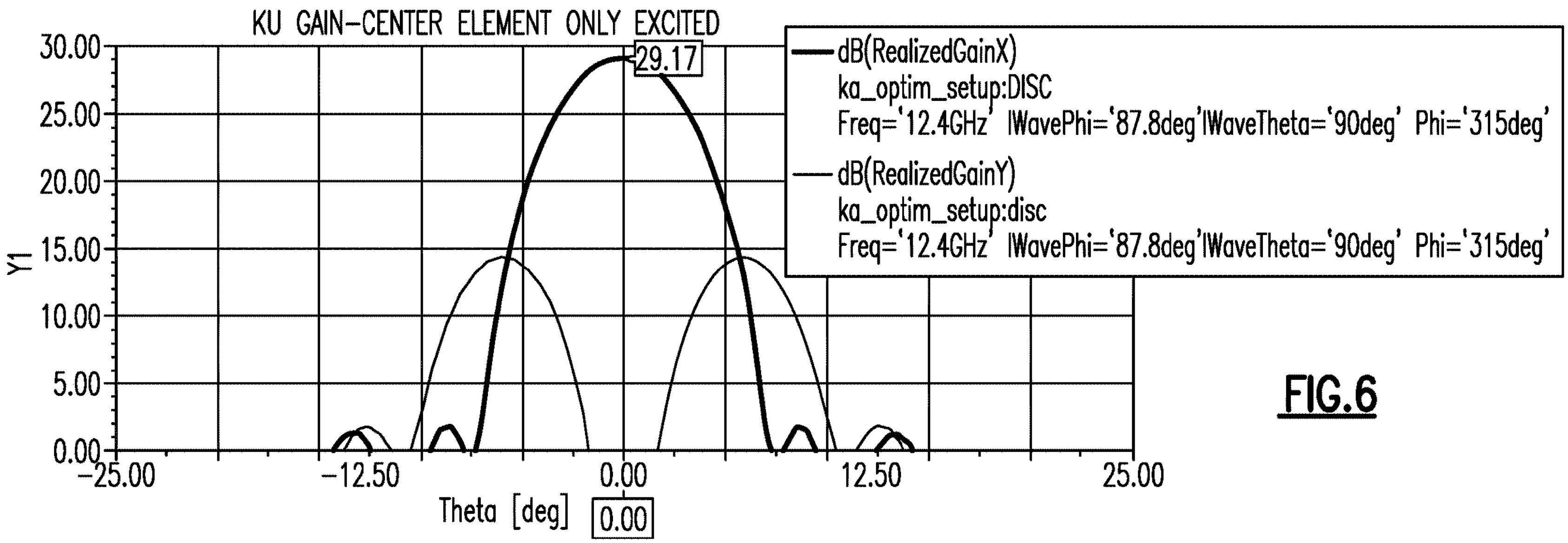

FIG. 6 is a plot of the Ku band gain at broadside with only the center bowtie element excited for broadside operation.

Figure 7:
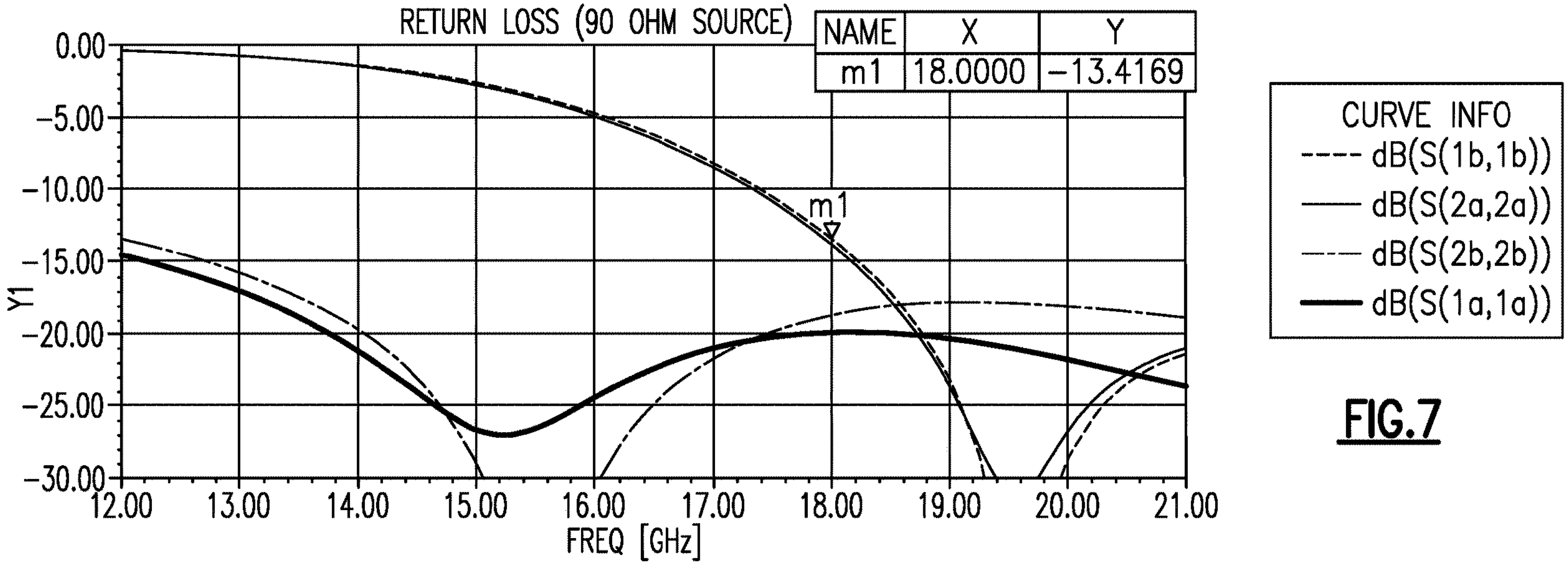

FIG. 7 is a plot of the return loss as a function of frequency for a 90 Ohm source.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An antenna system comprising:

a horn antenna; and a feed structure disposed within the horn antenna, the antenna system configured to produce a plurality of simultaneous beams each having an independent pointing angle to communicate with multiple fixed or non-fixed communication terminals in different locations.

2. The antenna system of claim 1 further comprising a lens mounted to the horn antenna, wherein the feed structure is positioned proximate a focal point of the lens.

3. The antenna system of claim 1 wherein the communication terminals include at least one of satellites, aircraft, and base stations.

4. The antenna system of claim 1 wherein the feed structure includes a focal plane array.

5. The antenna system of claim 4 wherein the focal plane array includes a plurality of bowtie elements.

6. The antenna system of claim 5 wherein the multiple communication terminals include three communication terminals, and the focal plane array includes five bowtie elements.

7. The antenna system of claim 6 wherein the five bowtie elements includes one central bowtie element and four edge bowtie elements arranged in a crossed configuration around the central bowtie element.

8. The antenna system of claim 7 wherein the central bowtie element is a dual-band bowtie element configured for operation in the Ku and Ka frequency bands, and the four edge bowtie elements are single-band bowtie elements configured for operation in the Ka frequency band.

9. The antenna system of claim 8 wherein the central bowtie element is larger than each of the four edge bowtie elements.

10. The antenna system of claim 4 wherein the focal plane array is axially symmetric.

11. The antenna system of claim 4 wherein the focal plane array is axially asymmetric.

12. The antenna system as claimed in claim 1, comprising:

a dielectric lens mounted to the horn antenna and disposed at least partially within an aperture of the horn antenna; and the feed structure comprising a focal plane array disposed within the horn antenna and located proximate a focal point of the lens, the focal plane array including a plurality of radiating elements such that the antenna system is configured to produce a plurality of independent beams with different pointing angles covering at least two distinct frequency bands.

13. The antenna system of claim 12 wherein the plurality of independent beams includes three independent beams and the at least two distinct frequency bands include the Ka band and the Ku band.

14. The antenna system of claim 13 wherein the plurality of radiating elements of the focal plane array includes a plurality of bowtie elements.

15. The antenna system of claim 14 wherein the plurality of bowtie elements includes five bowtie elements arranged in a crossed configuration.

16. The antenna system of claim 15 wherein the five bowtie elements include a central dual-band bowtie element configured for operation in the Ka and Ku bands, and four edge single-band bowtie elements arranged around the central dual-band bowtie element and each configured for operation in the Ku band, the central dual-band bowtie element being larger than each of the four edge single-band bowtie elements.

* * * * *